Patented Oct. 7, 1947

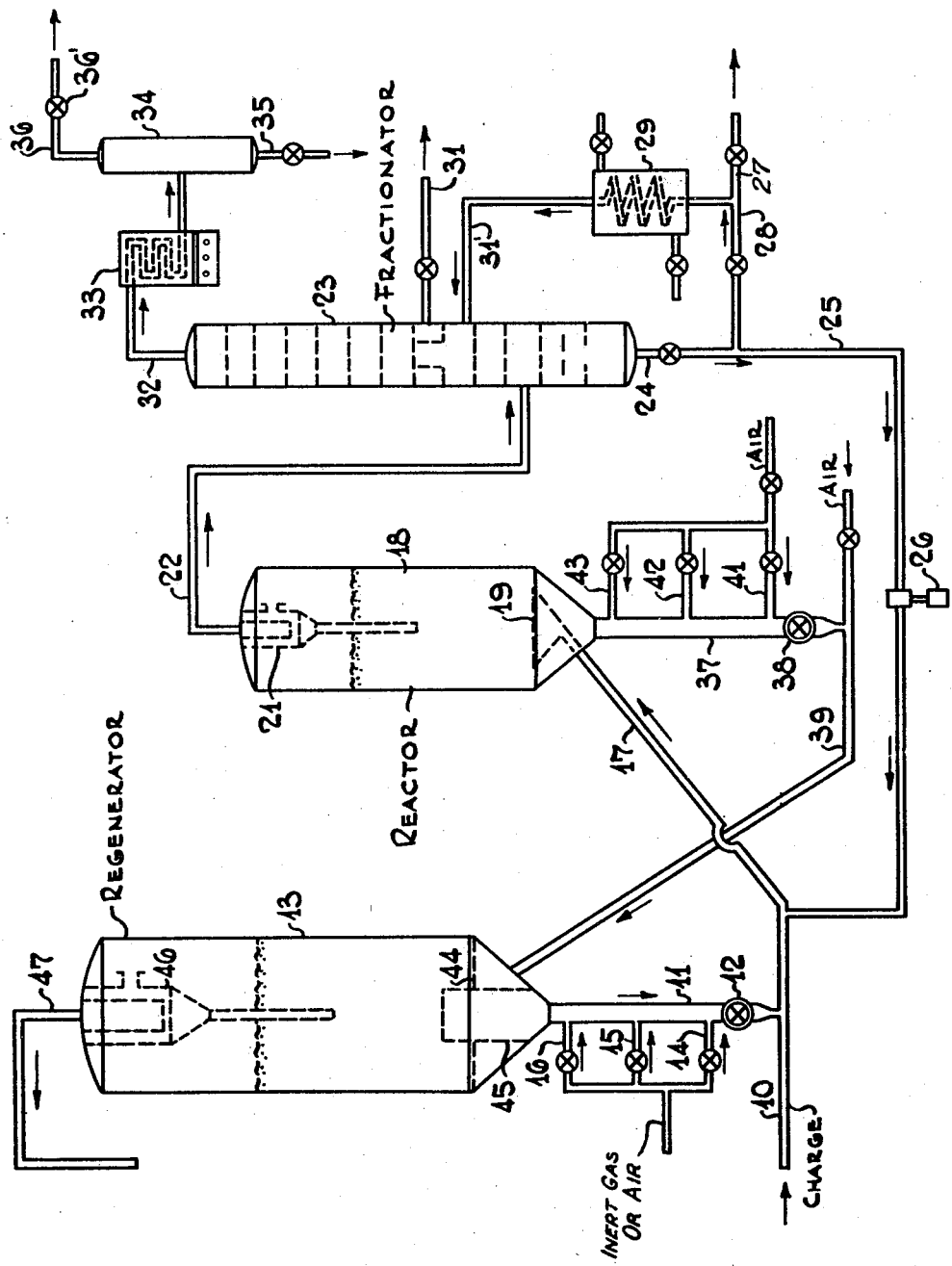

2,428,691

UNITED STATES PATENT OFFICE 2,428,691

PROCESS FOR STRIPPING SPENT CATALYST

Charles W. Tyson, Summit, N. J., assignor to Standard Oil Development Company, a corporation of Delaware Application June 10, 1944, Serial No. 539,704

6 Claims. (Cl. 196—52)

This invention relates to a method of treating gases and solids wherein carbonaceous materials are subjected to conversion in the presence of subdivided solid contact material which is continuously circulated through a conversion zone, and pertains more particularly to a method of and apparatus for removing volatilizable conversion fluids from the solid contact material withdrawn from the conversion zone.

While the invention in some of its broader phases may have a more general application, it is particularly adapted for the conversion of hydrocarbon oils and particularly for the catalytic cracking of such oils wherein the oil is converted in the presence of subdivided catalytic material which is continuously circulated through a conversion zone and thereafter through a regenerating zone in which combustible deposits formed during the conversion treatment are burned from the catalytic material and the catalytic material so regenerated then returned to the conversion zone.

According to one general type of process commonly known as the fluid process, the catalytic material in finely divided form is circulated in a fluidized state through the cracking and regenerating zones and the pressure lost during the circulation is restored by passing the catalytic material through a vertical column or standpipe containing a relatively dense mass of finely divided catalytic material maintained in a fluid state by injecting a small amount of a fluidizing gas into the material passing through the column. The amount of such fluidizing gas so introduced is normally maintained at the minimum sufficent to convert the powder into a fluid state capable of generating a fluid pressure at the base of the column.

According to previous practices the aerating gas introduced into the column or standpipe comprised in general an inert gas such as steam or spent combustion gases.

According to another general type of process the catalyst in a relatively coarse, granular form is gravitated downwardly through the conversion zone and the regenerating zone and is conveyed from the base of one of said zones to the top of the other by mechanical conveyors.

In both modes of operation the catalytic material removed from the conversion zone contains substantial quantities of volatile combustible material which not only increases the amount of heat liberated during regeneration but may also reduce the overall yield of valuable products produced during the conversion treatment. It has been proposed heretofore to subject the catalytic material withdrawn from such conversion zone to the action of an inert stripping gas such as steam or spent combustion gases. In many cases, however, the use of steam has a harmful effect on the catalytic material and the use of inert spent combustion gases normally requires the installation of an inert gas producer, thereby increasing the cost of the equipment.

One of the broader objects of the present invention is to provide an improved method of removing the volatilizable reaction products from the subdivided solids withdrawn from the reaction or conversion zone.

A more specific object of the invention is to provide an improved method of stripping or removing volatilizable reaction products from finely divided solid material which is circulated in a fluid state through the conversion and regenerating zones.

Other more specific objects of the invention will be apparent from the description hereinafter wherein reference will be made to the accompanying drawing illustrating the invention as applied to the fluid process for the cracking or conversion of hydrocarbon oils.

Referring to the drawing, the reference character 10 designates a charge line through which the oil to be cracked or otherwise converted is introduced into the equipment. This oil may comprise a light distillate stock such as naphtha which is to be subjected to reforming or refining, or it may comprise a higher boiling stock such as gas oils or reduced crudes which are to be subjected to the conversion process.

The oil passing through line 10 may be at room temperature or it may have been subjected to initial preheating. The oil passing through line 10 is intermixed with a stream of finely divided conversion catalyst discharging through vertical conduit 11 having a control valve 12 for regulating the amount of catalytic material introduced into the stream. The catalytic material so introduced may be an active cracking catalyst such as activated clays or synthetic absorbent materials of the same or different composition. Various types of cracking catalysts have heretofore been proposed for this purpose. The catalyst discharging through the conduit 11 into the oil stream is withdrawn directly from regenerator 13 positioned thereabove and is at substantially regeneration temperature. The amount of catalyst introduced may be controlled so that the heat from the catalyst is sufficient to supply the necessary heat for the conversion process. For example, the regenerator may be at a temperature of the order of from 1000° F. to 1200° F. The amount of catalyst introduced may be of the order of from one part of catalyst per part of oil by weight to 25 or more parts of catalyst per part of oil, depending upon the nature of the conversion, the activity of the catalyst, and other factors.

The catalytic material passing through the vertical conduit 11 is maintained in a fluid state by the injection of a small amount of fluidizing gas at one or more spaced points through lines 14, 15 and 16. The amount of gas in this case is limited to the minimum necessary to maintain the catalytic material in a fluid state capable of generating a fluid pressure at the base of the column. Under ideal conditions the amount of gas introduced through lines 14, 15 and 16 is just sufficient to compensate for the compression of the gas associated with the catalyst particles passing downwardly through the standpipe or column 11 so that the density in pounds of catalyst per cubic foot is substantially uniform throughout the full length of the column. Under these conditions the maximum amount of pressure can be generated with the minimum length of conduit 11. This is desirable because in the construction illustrated the regenerator is constructed above the standpipe and it is desirable for economic reasons to keep the regenerator at the lowest elevation possible.

The fluidizing gas introduced through lines 14, 15 and 16 may comprise any inert gas such as steam or spent combustion gases but preferably comprises air. The catalytic material passing through the conduit 11 normally contains a small amount of residual carbonaceous material not removed from the catalyst during regeneration in the regenerator 13. The amount of carbonaceous deposits contained on the catalyst is normally sufficient to react with the air introduced through lines 14, 15 and 16 and consumes substantially all of the free oxygen contained therein so that the gas entrained with the catalyst discharging into the oil stream is substantially devoid of free oxygen. The invention in its broader phases, however, is not limited to the type of gas introduced into the conduit 11.

The suspension of catalyst and oil formed in the conduit 11 continues through line 17 and is introduced into the bottom of reactor 18 through a distributing cone 19 having a perforated grid for distributing the suspension throughout the reactor. The distributing cone 19 is preferably spaced from the wall of the reactor 18 as illustrated to provide an annular passage for the removal of catalytic material from the reactor, as later described. The reactor 18 is preferably designed of such diameter that the velocity of the oil vapors passing upwardly through the reactor is reduced to such a point as to cause the finely divided catalytic material to separate into a relatively dense layer in the bottom portion thereof. The superficial velocity of the vapors to accomplish this purpose may be of the order of from 1 to 3 feet per second when employing finely divided catalytic material having a particle size below about 400 mesh and an apparent density below 1.0. The passage of the vapors upwardly through the reactor 18 maintains the catalytic material in a turbulent state so that a substantially uniform temperature is maintained throughout the reactor. The level of the turbulent bed of catalytic material within the reactor 18 above the point of introduction of the oil vapors therein is controlled as hereinafter described to provide the required contact time between the oil vapors and catalyst for producing the desired conversion. This contact time, in the case of catalytic cracking, may be of the order of from 5 to 50 seconds.

The weight space velocity as expressed by the weight of oil passing through the reactor per hour per weight of catalyst therein may range from 0.2 to 20.

The oil vapors after passing through the bed of catalytic material within the reactor 18 may be passed into a cyclone separator 21 positioned in the top of the reactor for removing the relatively small amount of entrained solids contained in the vapors. The vaporous conversion products after passing through the cyclone separator 21 are removed overhead through line 22 and are passed to a fractionating tower 23 wherein the vapors are subjected to fractionation. The higher boiling condensate fraction formed in the bottom section of the fractionating tower 23 normally contains a small amount of entrained catalytic material. This initially condensing fraction may be withdrawn from the bottom of the fractionating tower 23 through line 24 and may be recycled through line 25 and pump 26 to line 17 where it merges with fresh charging stock and catalyst passing to the reactor 18. In some cases it may be desirable to filter or otherwise concentrate the catalytic material contained in the oil and return only the catalytic material to the conversion zone. If desired, the bottom fraction from the fractionating tower may be withdrawn from the process through line 27. Also a portion of the bottom fraction may be passed through heat exchanger 29 where it is cooled and thereafter introduced into the fractionating tower through line 31' above the point of entry of the vapors therein to serve as a cooling and scrubbing medium for the vapors. Condensate formed in the upper section of the fractionating tower 23 may be withdrawn through line 31. Vapors remaining uncondensed in the fractionating tower 23 pass overhead through line 32 to a condenser 33 wherein the desired distillate is condensed. Products from the condenser 33 then pass to a product receiver 34 wherein the liquid distillate separates from the uncondensed vapors and gases. The liquid distillate is withdrawn from the receiver 34 through line 35 as a product of the process. A portion of the distillate may be returned to the bubble tower in order to provide cooling for reflux. The distillate may be subjected to any further finishing treatment desired to obtain the final market product. Vapors separated from the liquid distillate in the receiver 34 are removed overhead through line 36 having a valve 36' for maintaining the desired back pressure on the system. These gases may be passed to suitable absorption and fractionating equipment for separation and fractionation. The pressure maintained within the reactor 18, in the case of catalytic cracking, is preferably substantially atmospheric but may be mild superatmospheric up to 100 pounds per square inch.

Referring to the reactor 18, the bottom thereof communicates with conduit 37 which forms a second vertical column or standpipe for generating additional pressure on the catalyst for circulation. The space around the distributing cone 19 and the wall of the vessel and the bottom portion of the reactor below the cone may serve as a stripping zone in which catalytic material to be withdrawn is subjected to stripping treatment with a purging gas to remove volatilizable reaction products from the catalyst before discharging into the air stream, as later described.

A stream of catalyst is continuously withdrawn from the bottom section of the reactor 18 through vertical standpipe 37 and discharges through a valve 38 into a stream of air passing through line 39 which conveys it into the bottom section of the regenerator 13.

The present invention deals particularly with a method for removing the volatilizable reaction products from the catalyst being withdrawn from the reactor 18. In accordance with the present invention, there is injected into the stream of catalyst passing through column 37 a limited quantity of air. This air is introduced into the column at a point below the main stripping zone which, as illustrated, is located in the bottom section of the reactor. The amount of air introduced into the vertical column is more than sufficient to fluidize the catalyst and is adequate to obtain the desired stripping of the volatilizable products therefrom.

It has been found that the amount of carbon contained on the catalyst withdrawn from the reactor 18 is such that the oxygen contained in the air introduced into the column 37 is substantially completely and quickly combined with the carbon to form the oxides of carbon. The amount of air introduced into the conduit 37 through lines 41, 42 and 43 should be in excess of the minimum required for aeration but should be limited to that which will rapidly combine with the carbon contained on the catalyst at the point of introduction of the air therein to form combustion gases substantially devoid of oxygen.

The amount of gas necessary for fluidizing or aerating the column 37 may be defined as that necessary to compensate for the shrinkage in volume of gas intermixed with the catalyst passing through the standpipe. Unless some excess gas over and above that necessary to compensate for such shrinkage is supplied, the standpipe 37 cannot function for stripping the volatilizable hydrocarbons or other reaction products from the catalyst. In commercial operations the amount of air introduced into the column 37 may be sufficient to give a superficial velocity of gas through the column of the order of from 0.2 to 2 feet per second. The term "superficial velocity" as herein employed means the velocity which the gas would attain in the absence of finely divided solids within the column. By maintaining the superficial velocity of the gas stream passing through the catalytic material in the column 37 within this range, substantial stripping can be obtained within the column by the spent combustion gases formed by burning of the carbon with the air introduced through the spaced points 41, 42 and 43.

Expressed in another way, the catalytic material flowing downwardly from the bottom of the reactor into the standpipe is contacted with a rising stream of spent combustion gases resulting from the reaction of the air introduced at one or more spaced points 41, 42 and 43 with the carbonaceous deposits contained on the catalytic material. The lower portion of standpipe or column 37 into which the air is introduced thereby forms an inert gas producer so that the gases removed from the upper end of the column and passing into the reactor 18 are substantially devoid of free oxygen. The standpipe 37 also serves to effect a small degree of regeneration and this reduces the amount of regeneration necessary to be carried out in the reactor 13.

The bottom portion of the regenerator 13 may be in the form of a cone forming a distributing zone for the suspension of catalyst and air introduced through line 39. A perforated grid 44 may be provided above the conical bottom through which the suspension of air and catalyst is injected into the main portion of the regenerator 13. The velocity of the regeneration gas rising through the regenerator 13 is preferably controlled in the same manner as in the case of the vapors in the reactor 18 to permit the catalyst to segregate into a relatively dense, turbulent layer in the bottom portion of the regenerator 13. To this end, the superficial velocity of the rising gases may be of the order of from 0.5 to 3 feet per second, depending upon the size and density of the catalytic material. The catalyst is retained within the regenerator in contact with the oxidizing gas for a period sufficient to burn a predetermined portion of the carbonaceous deposits therefrom. A stream of regenerated catalyst continuously collects in a central compartment 45 located in the bottom of the regenerator which is in open communication with the vertical conduit or standpipe 11 previously described so that the regenerated catalyst continuously discharges back into the oil stream.

The spent combustion gases after passing through the bed of catalytic material undergoing regeneration within the regenerator 13 may be passed to a cyclone separator 46 positioned in the upper part of the regenerator for removal of entrained catalyst therefrom. It is usually preferred to maintain the level of the catalyst within the regenerator 13 at a substantial distance below the cyclone separator 46, such as a matter of from 5 to 15 feet, so as to reduce or minimize the amount of powder retained in the regeneration gas passing to the cyclone. The spent regeneration gas is removed from the cyclone separator 46 through line 47 and may be passed to further catalyst recovery equipment such as scrubbers, bag filters, Cottrell precipitators, or the like which, for purposes of simplicity, have not been shown on the drawing. Furthermore, prior to passing to such further separating equipment, the regeneration gas may be cooled either by passing to suitable heat exchange equipment in a manner well known in the art or by injection of water, or both.

Referring to the reactor 18, the level of the dense, turbulent layer of catalytic material therein is also preferably maintained a substantial distance below the cyclone separator 21 so as to reduce the amount of entrained catalyst carried into the cyclone separator 21 by the vaporous products.

While I have shown and described a fluid catalyst process in which the stripping and purging of the spent catalyst are carried out principally in the spent catalyst standpipe used for generating pressure, a separate tower independent of the standpipe may be provided. Such a tower may be positioned immediately above the standpipe, or the catalyst may be transferred from the bottom of the stripping tower into the top of the standpipe by means of a carrier gas. In the latter case, additional separators are provided for separating catalyst from the stripping gas.

Furthermore, the invention in its broader phases is not limited to the fluid process but could be applied to a moving bed type process previously described. In any case, the stripping tower should be considerably longer than the diameter. The length of the stripping tower is preferably from 3 to 8 tower diameters.

While the invention has been described as applied to the catalytic cracking of hydrocarbon oils employing the fluid catalyst process, it will be understood that some of the broader phases of the invention are not so limited.

What is desired to be protected by Letters Patent is:

1. A process for cracking hydrocarbon oils which comprises passing the oil to be cracked through a cracking zone, passing a subdivided cracking catalyst through said cracking zone in contact with said oil, maintaining said oil in contact with said catalyst at a temperature and for a period sufficient to obtain substantial cracking thereof, thereafter removing the vaporous conversion products from said zone, continuously removing a stream of said subdivided cracking catalyst from said zone containing appreciable amounts of vaporous conversion products and combustible deposits, passing the stream so withdrawn downwardly through a vertical column, introducing an oxidizing gas into the bottom portion of said column, controlling the amount of oxidizing gas so introduced so that the oxygen is rapidly and completely consumed by burning a portion of the combustible deposits contained on said catalytic material, passing the resulting combustion gases substantially devoid of free oxygen upwardly through said column to strip and replace the vaporous conversion products from the catalyst, removing catalyst from the base of said column and transferring the catalyst so removed into a regenerating zone, passing an oxidizing gas through said regenerating zone, maintaining said catalyst within said regenerating zone in contact with said catalyst for a substantial period to burn additional amounts of combustible deposits therefrom, and thereafter returning the hot regenerated catalyst to the cracking zone.

2. A process for the conversion of hydrocarbon oils which comprises passing a stream of oil vapors upwardly through a conversion zone containing finely divided conversion catalyst, passing the vapors upwardly through said conversion zone at a velocity controlled to maintain a relatively dense, turbulent layer of finely divided catalytic material in the bottom portion of said conversion zone, maintaining said conversion zone at the desired conversion temperature, removing vaporous conversion products from the upper portion of said conversion zone, fractionating the vaporous conversion products to separate a desired product therefrom, continuously withdrawing a stream of catalytic material containing appreciable amounts of vapors conversion products and solid combustible deposits from the bottom portion of said conversion zone, passing said stream of finely divided catalyst so withdrawn downwardly through a vertical column maintained substantially full of said catalytic material, introducing a stream of air into the bottom of said column, controlling the amount of air so introduced to cause rapid and complete consumption of said air and to form a combustion gas substantially devoid of free oxygen, passing the combustion gas upwardly through said column to effect replacement of vaporous conversion products from the catalyst, passing catalyst from the base of said column into a regenerating zone, subjecting the catalyst to further regeneration within said regenerating zone to remove additional amounts of combustible deposits therefrom, and returning the regenerated catalyst to the conversion zone.

3. A process for cracking hydrocarbon oils which comprises passing the oil in vapor form upwardly through a cracking zone containing a body of finely divided cracking catalyst, controlling the velocity of the oil vapors passing upwardly through said cracking zone to maintain a relatively dense, turbulent body of catalyst in the bottom portion of said cracking zone, maintaining said oil vapors in contact with said catalyst within the cracking zone for a period sufficient to obtain substantial cracking thereof, removing a relatively dense stream of catalyst containing appreciable amounts of vaporous conversion products and solid combustible deposits from the bottom portion of said cracking zone, passing said stream of catalyst so removed downwardly through a vertical column maintained substantially full of said catalyst, introducing a stream of air into the bottom portion of said column, limiting the amount of air so introduced to consume rapidly and completely the oxygen contained therein by burning of carbonaceous deposits contained on said catalyst, passing the stream of combustion gases upwardly through said column at a velocity controlled to strip and replace vaporous conversion products from the stream of catalyst so removed, passing the catalyst from the base of said column into a regenerating zone, passing a stream of oxidizing gas upwardly through said regenerating zone at a velocity controlled to maintain a relatively dense, turbulent layer of catalytic material therein, maintaining said catalyst in contact with said oxidizing gas within the regenerating zone for a period sufficient to remove a substantial portion of combustible deposits contained thereon, and thereafter returning the hot regenerated catalyst to the cracking zone.

4. A process according to claim 2 wherein the catalytic material is withdrawn in a dense phase and passed to the upper part of said column wherein the catalytic material is maintained in a dense fluidized condition.

5. A process according to claim 2 wherein the catalytic material is withdrawn in a dense phase and passed to the upper part of said column wherein the catalytic material is maintained in a dense fluidized condition and the stripped-out material and combustion gases pass into said conversion zone.

6. A process for the conversion of carbonaceous material which comprises passing said material through a conversion zone, passing a subdivided conversion catalyst through said zone in contact with said carbonaceous material, removing vaporous conversion products from said zone, removing a stream of subdivided conversion catalyst containing solid combustible deposits and associated with a small amount of vaporous conversion products from said zone, passing an oxidizing gas in countercurrent contact with said stream, limiting the amount of oxidizing gas contacting said stream to completely and rapidly consume the oxygen contained therein by burning combustible deposits from the catalyst during the initial stage of contact whereby the catalyst removed from said conversion zone is first contacted with spent combustion gases relatively free of oxygen resulting from the burning of said combustible deposits and thereafter with oxidizing gas, said spent combustion gas serving to displace vaporous conversion products associated with said catalyst, thereafter passing the stream of catalyst to a regeneration zone and contacting the catalyst in said regeneration zone with a fresh supply of oxidizing gas separate and independent from said first-named oxidizing gas.

CHARLES W. TYSON.

REFERENCES CITED

The following references are of record in the file of this patent:

UNITED STATES PATENTS

| Number | Name | Date |
|---|---|---|
| 2,273,076 | Voorhees | Feb. 17, 1942 |
| 2,289,329 | Prickett | July 7, 1942 |
| 2,290,580 | Degnen et al. | July 21, 1942 |
| 2,303,717 | Arveson | Dec. 1, 1942 |
| 2,311,564 | Munday | Feb. 16, 1943 |
| 2,358,039 | Thomas et al. | Sept. 12, 1944 |
| 2,374,151 | Wolk et al. | Apr. 17, 1945 |
| 2,367,281 | Johnson | Jan. 16, 1945 |
| 1,984,380 | Odell | Dec. 18, 1934 |
| 2,373,008 | Becker | Apr. 3, 1945 |
| 2,391,944 | Carlsmith | Jan. 1, 1946 |
| 2,407,052 | Bailey et al. | Sept. 3, 1946 |

FOREIGN PATENTS

| Number | Country | Date |
|---|---|---|
| 118,399 | Australia | Apr. 27, 1944 |